O. WENTZ.
TANK GAGE.
APPLICATION FILED MAR. 4, 1916.

1,238,231.

Patented Aug. 28, 1917.
2 SHEETS—SHEET 1.

Inventor
Orville Wentz

Witnesses

By Victor J. Evans
Attorney

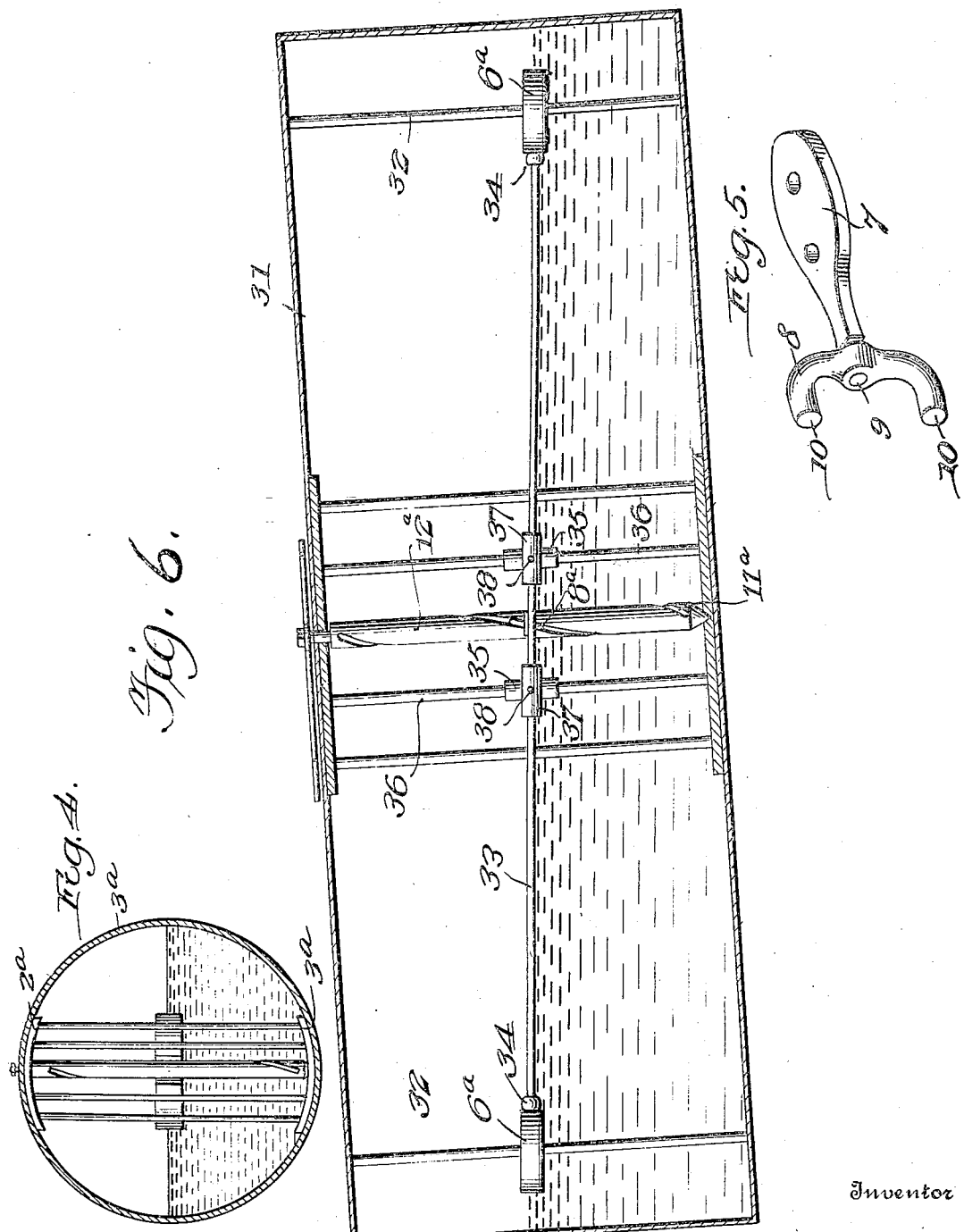

UNITED STATES PATENT OFFICE.

ORVILLE WENTZ, OF HARTFORD CITY, INDIANA.

TANK-GAGE.

1,238,231.   Specification of Letters Patent.   Patented Aug. 28, 1917.

Application filed March 4, 1916. Serial No. 82,230.

*To all whom it may concern:*

Be it known that I, ORVILLE WENTZ, a citizen of the United States, residing at Hartford City, in the county of Blackford and State of Indiana, have invented new and useful Improvements in Tank-Gages, of which the following is a specification.

This invention is an improved tank gage for indicating the quantity of liquid in a tank and especially adapted for use in automobiles and in connection with stationary engines and the like, for indicating the quantity of gasolene or oil in the tank which supplies the engine with fuel, the object of my invention being to provide an improved gage of this character which is cheap and simple in construction, which may be used in any ordinary tank, which is accurate and is not likely to get out of order.

The invention consists in the construction, combination and arrangement of devices hereinafter described and claimed.

In the accompanying drawings:—

Fig. 4 is an elevation showing a modified construction of the gage in which the same is adapted to be arranged at an upright position in a horizontal cylindrical tank the tank being shown in section.

Fig. 5 is a detail view.

Fig. 6 is a vertical sectional view of a modified form of my invention especially adapted for use in an automobile gasolene tank and embodying the use of a float consisting of two float members and a rod.

Figure 1:
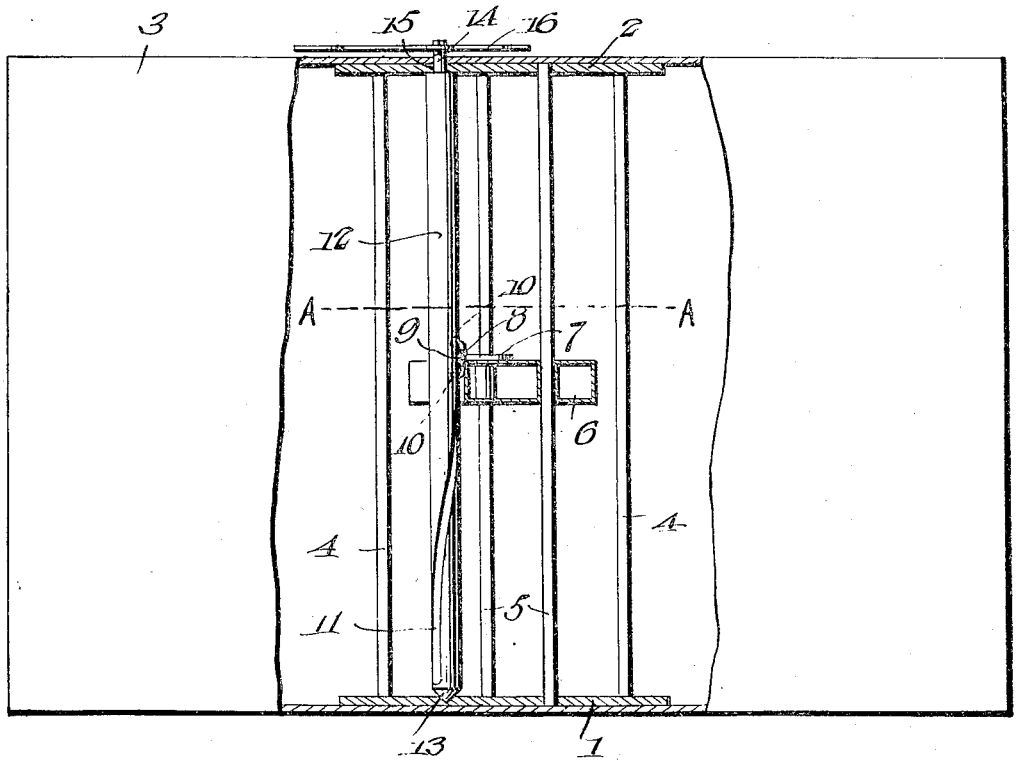
Figure 1 is partly an elevation and partly a sectional view of the tank gage constructed in accordance with my invention showing the same arranged in a tank, the top and bottom of which are indicated in section.
Figure 2:
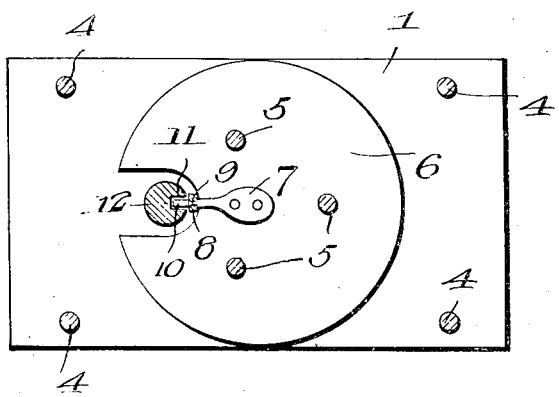
Fig. 2 is a horizontal sectional view of the same on the plan indicated by line A—A of Fig. 1.
Figure 3:
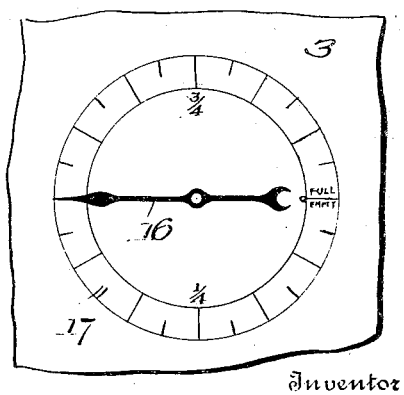
Fig. 3 is a plan of the same showing the indicating dial.

In the embodiment of my invention, I provide a bottom plate 1 and a top plate 2 which are adapted to be placed respectively on the bottom and directly under the top of a tank 3. When the bottom and top of the tank are flat, the plates 1 and 2 are correspondingly shaped. When, as indicated in Fig. 4, the tank 3ᵃ is cylindrical and horizontally arranged, the bottom plate 1ᵃ and top plate 2ᵃ are curved to correspond with the shape of and to fit in the said tank as shown. The said bottom and top plates are connected together by brace rods 4. They are also connected together by guide rods 5 of which any suitable number may be employed, three being here shown. These guide rods are arranged between and connected to the plates near the centers of the latter. A float 6, which may be of any suitable construction, is provided with openings through which the guide rods extend, so that the float is adapted for vertical movement on the guide rods. On one side of the float is an arm 7 which projects radially therefrom. A crescent shaped tappet 8 is centrally pivotally mounted on the arm 7 as at 9. The said tappet is provided with a pair of spaced points 10 which operate in a spiral groove 11 in an indicating shaft 12.

By thus pivotally mounting the tappet provided with a pair of spaced points, the tappet is adapted to readily turn to conform to the spiral groove of the indicating shaft, friction between the tappet and the sides of the groove is reduced to the minimum and moreover binding of the tappet in the groove is prevented.

The said shaft is vertical, is parallel with the guide rods 5 and has its lower end provided with a step bearing 13 on the bottom plate 1, the upper end of said shaft having a vertical spindle 14 arranged in a bearing opening 15 of the top plate 2 and provided at its upper end with an indicating end or pointer 16.

It will be understood that the float rises and falls with the level of the gasolene or other liquid in the tank and that its vertical movements cause its tappet 10, by engagement with the spiral groove 11 of the indicating shaft 12, to turn said shaft and hence also turn the indicating hand 16. This hand sweeps over an indicating dial 17 which is provided with suitable graduations that indicate quantities in the tank, as will be understood. Hence the quantity of liquid in the tank is at all times correctly and automatically indicated by the dial and its hand.

The gage, in practice, may be built as part of the tank or the like, in connection with which it is used. Or, the gage may be soldered or riveted or otherwise secured as may be found desirable.

On Fig. 6 of the drawing, I show a modified form of my invention especially adapted for use in a gasolene tank 31 of an automobile and in which vertically arranged guide rods 32 are employed near the ends of the tank and the float comprises a pair of members 6ª which operate on said guide rods. A rod 33 is provided which has its outer end connected as by means of ball and socket joints 34 to the said float members and is provided at its center with a pivotally mounted tappet 8ª similar to the tappet 8 hereinbefore described, and the points of which operate in a spiral groove 11ª of the indicating shaft 12ª. Sleeves 35 are arranged for vertical movement on guide rods 36 and are each provided with a pivoted cross tube or bearing 37, the pivot of which is indicated at 38. The rod 33 passes through the said cross tube 37.

By thus constructing the float of two members and a rod which connects them and has a tappet element, engaging the groove of the indicating shaft, the contents of the tank will be measured and indicated at all times, regardless of whether the tank is horizontal or is inclined, in one direction or the other.

While I have herein shown and described a preferred form of my invention, I would have it understood that changes may be made in the form, proportion, and construction of the several parts without departing from the spirit of the invention and within the scope of the appended claims.

Having described the invention, what is claimed is:

1. In a tank gage of the class described, a float, a guide for the float, a revoluble indicating shaft having a spiral groove, and a tappet pivotally mounted on the float and having a pair of spaced points engaging in said groove.

2. In apparatus of the class described, a tank, a revoluble indicating shaft in the center of the tank and having a spiral groove, a float arranged in and extending longitudinally of the tank, guiding means for the float, and a pivotally mounted tappet carried by the float and having a pair of spaced points engaging in the groove of the indicating shaft.

In testimony whereof I affix my signature in presence of two witnesses.

ORVILLE WENTZ.

Witnesses:
J. P. CRONIN,
L. B. SIMMONS.